ID

US010819722B2

(12) United States Patent
Dhakshinamoorthy et al.

(10) Patent No.: US 10,819,722 B2
(45) Date of Patent: Oct. 27, 2020

(54) BLOCKCHAIN FOR SECURING DISTRIBUTED IIOT OR EDGE DEVICE DATA AT REST

(71) Applicant: HONEYWELL INTERNATIONAL INC., Morris Plains, NJ (US)

(72) Inventors: Chandirasekaran Dhakshinamoorthy, Banglore (IN); Basavaraju Vasamurthy, Bengaluru (IN); Rod Stein, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 316 days.

(21) Appl. No.: 15/927,617

(22) Filed: Mar. 21, 2018

(65) Prior Publication Data
US 2019/0297101 A1    Sep. 26, 2019

(51) Int. Cl.
*H04L 29/06* (2006.01)
*G06F 21/62* (2013.01)
*G06N 20/00* (2019.01)

(52) U.S. Cl.
CPC ...... *H04L 63/1425* (2013.01); *G06F 21/6218* (2013.01); *G06N 20/00* (2019.01); *H04L 63/0442* (2013.01); *H04L 2463/121* (2013.01)

(58) Field of Classification Search
CPC ............. H04L 63/1425; H04L 63/0442; H04L 2463/121; G06N 20/00; G06F 21/6218
See application file for complete search history.

(56) References Cited

U.S. PATENT DOCUMENTS

| | | | |
|---|---|---|---|
| 2017/0324738 A1 | 11/2017 | Hari et al. | |
| 2018/0005186 A1* | 1/2018 | Hunn | G06F 40/103 |
| 2018/0075527 A1* | 3/2018 | Nagla | G06F 21/64 |
| 2018/0097883 A1* | 4/2018 | Chow | H04L 65/1069 |
| 2019/0163912 A1* | 5/2019 | Kumar | H04L 9/3247 |
| 2019/0207965 A1* | 7/2019 | Espinosa | G06F 16/2255 |
| 2019/0236879 A1* | 8/2019 | Ivanov | H04L 9/0643 |

(Continued)

FOREIGN PATENT DOCUMENTS

WO    2017/177260 A1    10/2017

OTHER PUBLICATIONS

Mads Becker Jorgensen, et al., "Blockchain data integrity" 2018 https://www.ericsson.com/hyperscale/cloud-infrastructure/data-centric-security/data-integrity-assurance.

(Continued)

*Primary Examiner* — Sarah Su

(57) ABSTRACT

A method of securing data in an industrial processing facility (IPF) includes creating a private blockchain (PB) using a OPC UA standard functionality and storing the PB in an OPC UA address space adding it to an OPC UA communication protocol framework including edge-nodes coupled to a cloud-based or edge-located data storage. The edge-nodes are PB participant nodes, and a regulator or leader assigns them a single role as a blockmaker, block voter, or observer. The hash in the public ledger is updated once a new block is validated by a majority of the block voters, and the new block is propagated to all PB participant nodes. The regulator, leader or observer utilizes a time bound majority voting consensus to determine whether the PB participant nodes come to a consensus on a current state in the storage medium, and if a consensus the new block added to the public ledger.

17 Claims, 8 Drawing Sheets

(56) References Cited

U.S. PATENT DOCUMENTS

2019/0289068 A1* 9/2019 Ma .......................... H04L 45/00
2019/0385165 A1* 12/2019 Castinado ............ G06Q 20/352
2019/0394243 A1* 12/2019 Wiig ..................... H04L 9/3093

OTHER PUBLICATIONS

Mads Becker Jorgensen, et al., "Industrialized Blockchain and Data Integrity" 2016 https://asset.zeqr.com/classFiles/2017/Apr/1491981429-58edd475b6393.pdf.

* cited by examiner

| GENESIS BLOCK "N"  460 |
|---|
| NAMESPACE INDEX FOR BLOCKCHAIN<br>DEVICE ID, FOR WHICH GENESIS BLOCK BELONGS TO<br>PARTICIPANTS WHO WILL ACT AS VOTERS AND OBSERVERS FOR THIS BLOCKCHAIN<br>EACH VOTER'S SAMPLING INTERVAL, PUBLISHING INTERVAL, KEEP ALIVE COUNT AND LIFETIME COUNT<br>SERVER AND SOURCE TIMESTAMP OF GENESIS BLOCK CREATION |

FIG. 4B

CONTINUED FROM FIG. 5A

ADMIN WILL CALL BLOCK_EXISTS FUNCTION WITH CLOUD_ID AND BLOCK_NUMBER, WITH ALL OTHER BLOCK_MAKERS AND/OR LEDGER.

IF THERE IS ANY BLOCK WITH SAME BLOCK_NUMBER, BLOCK_NUMBER WILL CHECK THE TIME OF CREATION OF BLOCK OR TIME OF VALIDATION. WHICH EVER IS THE ERLIEST IS GOING TO WIN THE ARGUMENT

IF ANY OTHER BLOCK_MAKER(S) RESPONDS TRUE THEN CREATED BLOCK_NUMBER WILL BE DISCARDED AND ADMIN WILL CALL SYNC ON ALL BLOCK_MAKERS.

IF THERE IS NO BLOCK WITH THE SAME NUMBER, ADMIN WILL CALL FUNCTION UPDATE_BLOCK_CHAIN ON BLOCK_MAKER. + BLOCK_MAKER WILL THEN CREATE NODE ID WITH BLOCK_NUMBER IN A LEDGER (MOSTLY ITSELF) WITH THE NAMESPACE INDEX AS GIVE IN THE GENESIS_BLOCK. THIS BLOCK CAN NEVER BE DELETED BY THE SERVER.

BLOCK_MAKER WILL CREATE HASH FOR THE CURRENT BLOCK ADDED IN THE BLOCKCHAIN WHICH CAN BE USED AS PREVIOUS_BLOCK_HASH FOR NEXT BLOCK.

AFTER SUCCESSFUL CREATION OF THE BLOCK MAKING SUCCESSFUL ENTRY IN THE BLOCKCHAIN, BLOCK_MAKER WILL CALL FUNCTION IN ADMIN TO SYNC_BLOCK (WITH BLOCK_INFORMATION).

ADMIN WILL CALL ALL LEDGERS TO UPDATE THEIR BLOCKCHAIN WITH NEW BLOCK.

∨ 🗁 DEVICEID_123456
　> ▢ 0_GENESISBLOCK
　> ▢ 1_BLOCK
　> ▢ 2_BLOCK
　> ▢ 3_BLOCK
　> ▢ 4_BLOCK

BLOCKCHAIN FOR SECURING DISTRIBUTED IIOT OR EDGE DEVICE DATA AT REST

FIELD

This Disclosure relates to mechanisms for securing stored Industrial Internet of Things (IIoT) or edge device data associated with the operation of an industrial plant.

BACKGROUND

OPC Unified Architecture (OPC UA) developed by the OPC Foundation is a platform independent machine-to-machine (M2M) data communication protocol which specifies how to exchange data between different systems, software applications, and hardware devices. OPC UA enables exchange of data between software applications independently of the application's vendor, supported operating system, and programming language used.

OPC-UA supports robust, secure communications that assure the identity of clients and servers and resists attacks. OPC-UA also defines sets of services that servers may provide. OPC-UA is a device-centric technology designed to support device interoperability and integration of sensors, embedded devices and controllers such as programmable logic controllers (PLCs) into a larger system. As the Industrial IOT (IIoT) connected industrial plant adoption grows, IIoT data is considered as an important component in the realizing the potential economic impact by enabling man and machine to make informed real-time industrial process decisions. The IIoT is known to be a network of intelligent computers, devices, and objects that collect and share huge amounts of data. The collected data is sent to at least one central cloud-based service where it is aggregated with other data and then shared with end users.

The industrial plant may be connected as a network of distributed edge devices with edge computing and analytics, data being processed near the source, in sensors, controllers, machines, gateways, and the like. As known in the art and as used herein an edge device (or edge-node device) is a type of networking device which can connect an internal local area network (LAN) of edge devices with an external wide area network (WAN) and not to the Internet and thus be part of a private industrial processing facility (IPF), or be connected to an external network by the Internet such as to the cloud services. The edge devices handle IIoT data (such as OPC data) which can also be termed 'Edge data'. Edge data can thus be stored in memory(ies) within a distributed network of edge devices, or in a memory(ies) within the cloud.

OPC UA has built-in protection mechanisms for protecting the IIoT data whether with a cloud connection or without a cloud connection (in a distributed network of edge devices) while in use and in motion using standard security mechanisms by providing a suite of controls including for data transport with numerous protocols defined providing options. For example, the ultra-fast OPC-binary transport or the more universally compatible Simple Object Access Protocol (SOAP)-Hypertext Transfer Protocol Secure (HTTPS). OPC UA can have session encryption where data messages are transmitted securely at 128 or 256 bit encryption levels.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize OPC UA built-in data security protections for IIoT data are effective while the data is in use (or in motion), but do not provide any protection for stored IIoT data Because IIoT data is used by IIoT vendors using big data analytics or real-time stream analytics of sensor data, by storing them in a cloud-based storage medium (e.g., a data factory or 'data lakes') in third party cloud providers, or in removable/flash drives such as pen drives or secure digital (SD) cards in a network of distributed edge device nodes, a threat vector of data integrity of stored IIoT persistent data is opened.

The IIoT data can be OPC UA data, Advanced Message Queuing Protocol (AMQP) or Message Queuing Telemetry Transport (MQTT) data, which are all example open data protocols for asynchronous message queuing. In the cloud-connected case, the tampering of stored IIoT persistent data in third party (cloud located) storage providers can lead to hazardous impact in the IIoT process, thereby impacting confidence in adoption of IIoT. In a non-cloud case the IIoT data generated from smart sensors can be transferred between any un-trusted edge gateways in different Fog units for processing. Another example is the storing of data for future use in flash storage device/pen drives which are shared across the distributed edge device network participants. Hence there is recognized to be a need to provide a data integrity mechanism for stored distributed IIoT data in the cloud, and for data stored in a distributed data storage devices, which brings trust in the stored data to all the network participants.

One disclosed embodiment comprises a private blockchain (PB)-based data integrity arrangement for protecting distributed IIoT data (e.g., OPC data) in cloud connected or non-cloud connected distributed edge device plant networks, while the data is at rest in an IPF. A blockchain is known to be a distributed ledger, analogous to a distributed database that comprises a continuously growing list of records, called 'blocks', which are linked and secured using cryptography, where each block typically contains a hash pointer as a link to a previous block, a timestamp, and data. A PB as used herein is a blockchain operated by an organization within a closed (non-public) communications network. As used herein an IPF runs an industrial process involving a tangible material that disclosed embodiments apply. For example, the IPF can be involved in oil and gas, chemical, beverage, pharmaceutical, pulp and paper manufacturing, petroleum processes, electrical, and water. An IPF is distinct from a data processing system that in contrast only performs data manipulations.

For disclosed PBs a new block is the 'current' part of a blockchain which records some or all of the recent data transactions (e.g., sensor data transmissions) between the nodes in the IPF and at least one central cloud-based data storage medium or a storage medium in a distributed edge network that lacks a cloud connection. Once verified, for disclosed PBs a new block goes into the PB as a permanent database, and each time a new block gets completed with verification (a consensus by the PB participant nodes) it will be added to the public ledger of the PB. For every different storage medium, a new blockchain is generated. The disclosed consensus mechanism is by which the PB participant nodes in the IPF can collaborate and participate in the PB network (that may also herein be referred to as a Blockchain ecosystem) to add a new block to the public ledger only when the PB participant nodes come to a consensus. A disclosed anomaly detection process can also be initiated in an on-demand or in a periodic manner by the PB administrator or regulator to find any malicious activity in the PB network, including responsive to a failed consensus.

BRIEF DESCRIPTION OF THE DRAWINGS

FIG. 4B shows a genesis block 'n' which is the root node of the Blockchain which has to initialized with custom information such as namespaceindex for blockchain, device id, participant details, sampling/publishing interval time, timestamps details.

FIGS. 5A-B show a disclosed blockchain realization with OPC-UA Subscription/Monitoring (Sub/Mon) for implementing a disclosed blockchain consensus for securing stored distributed device data at rest, while

DETAILED DESCRIPTION

Figure 1:
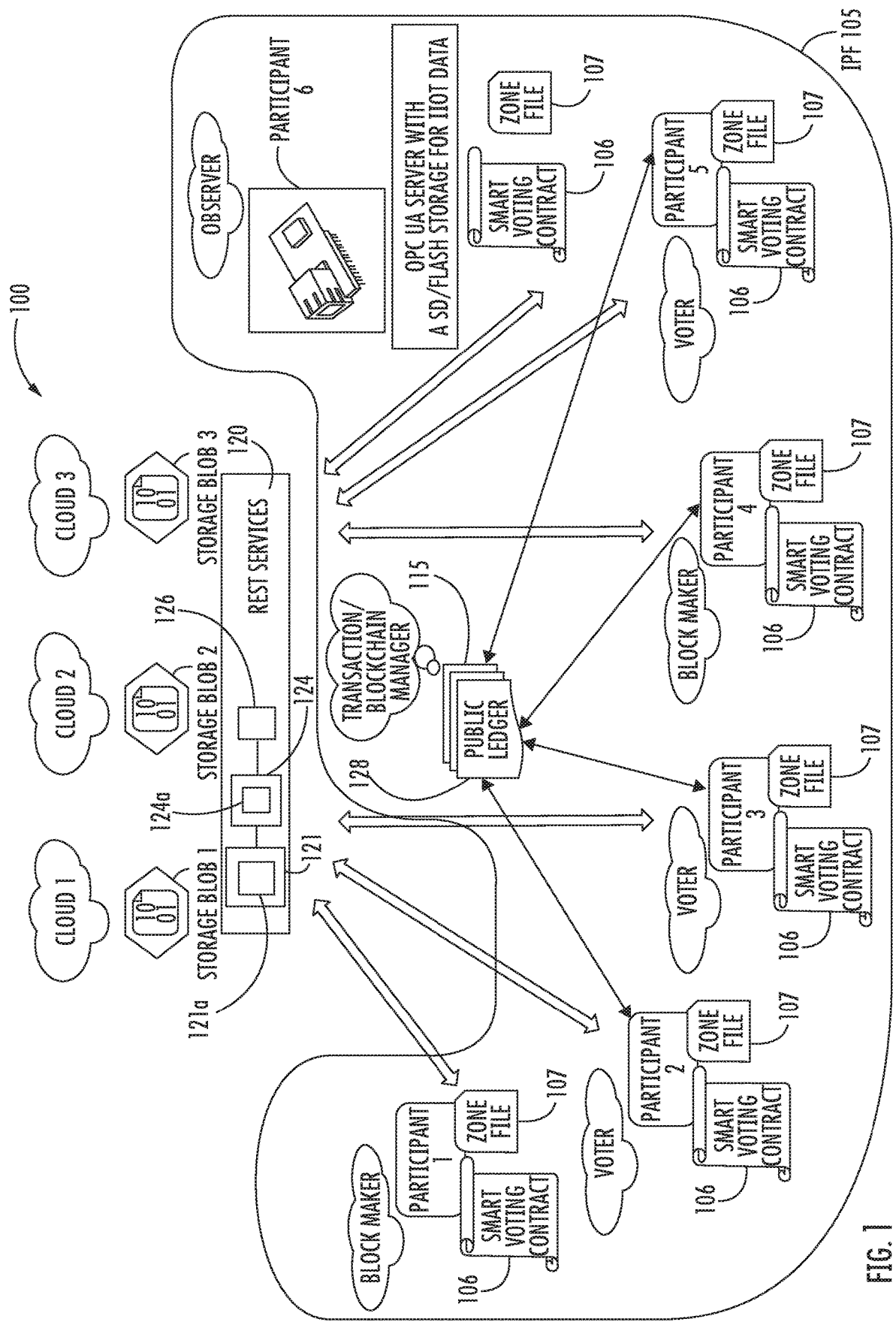
FIG. 1 shows nodes of an example IPF shown as blockchain edge device participants 1 to 6 in in a system including cloud storage of data which implements secure distributed IIOT device data at rest.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. Numerous specific details, relationships, and methods are set forth to provide a full understanding of the disclosed embodiments.

Disclosed blockchain consensus for securing stored distributed device data leverages functionality provided by OPC UA, such as its publishing Sub/Mon mechanism, to exchange the generated block from a block maker to voters/validator (or observers) and validated blocks from block maker to ledgers. Blockchain is available with an OPC UA server in the server's address space for a cloud-based storage medium or a non-cloud based data storage medium. A Blockchain representation in OPC UA address space is recognized to provide an easier and better IIoT data storing mechanism, where each Block in a blockchain is represented as a variable node in OPC UA address space, that provides a significant amount of meta data of a block.

As an OPC UA server can host multiple namespaces in address space, this is recognized to provide an opportunity for a ledger which is acting as OPC UA device will be able to hold multiple PBs, which is the source authenticity of any data storage medium. Disclosed anomaly detection (described in detail below) can be used by a PB administrator or regulator which can perform it on-demand or in a periodic manner in a distributed IIoT network (whether cloud connected or not) for block validation, including before accessing data from the storage medium.

A PB is created using at least one OPC UA standard functionality, and the PB is stored in an OPC UA address space to add the PB to an OPC UA communication protocol framework. An address space is a place in a visual representation or memory in hardware, where all the necessary properties/attributes of the data which is represented to the outer world is stored. The OPC UA communication protocol framework has a plurality of nodes including IIoT edge-nodes, in the cloud-connected case including at least one edge gateway node that are each configured in the IPF and communicably coupled to at least one cloud-based data storage medium that during IPF operation the plurality of nodes access data from. The PB utilizes the plurality of nodes as PB participant nodes including at least two nodes maintaining a public ledger including an updatable hash, wherein the storage medium has its own blockchain.

The PB has a role-based participation including a regulator or leader that assigns the respective PB participant nodes a single role. The roles are selected from a blockmaker for generating new blocks, a block voter, an observer (or a 'validator'), and an optional RootHashCalculator. A leader is elected by the blockchain participant nodes. A leader has similar duties to that of a regulator, but by default a regulator that is generally a discovery server in a PB system which holds basic information about the servers in the networks for limited time will perform these duties until a leader is elected by PB participant nodes. The leader is generally periodically elected by the blockchain participant nodes. There can be multiple blockmakers.

FIG. 1 shows device nodes of an example system 100 including cloud storage of data with cloud storage sites shown a cloud 1, 2 and 3 which implements secure distributed IIoT data at rest shown as PB participants 1 to 6 in a disclosed IPF. Cloud storage sites 1, 2 and 3 store IIoT data associated with operation of the IPF 105.

Participants nodes 1, 2, 3, 4, 5 and 6 are all shown as edge-nodes as they are all edge located. As noted above the PB participant nodes are assigned role-based participation by a leader or a regulator (before a leader is elected) in the PB. Each PB participant node is shown including a smart voting contract 106 and a zone file 107. A smart voting contract includes a consensus approach which is a mechanism to validate a generated block. A zone file is a mechanism by which the PB participant nodes find their nearby PB participant nodes.

PB participant nodes 1 and 4 are shown as blockmakers, participant nodes 2, 3 and 5 are shown as being block voters, and participant node 6 as an observer comprising an OPC UA server with a SD/flash storage for IIoT data. Each participant node shown in the PB within the IPF 105 thus has a single role selected from roles comprising a blockmaker for generating new blocks, a block voter, and an observer. Participant nodes 1 to 6 are all shown with the arrows indicating being communicably coupled over Ethernet, or a Time Sensitive network (TSN) in an IIoT ecosystem, or wireless connection to the rest services block 120 shown. Rest services block 120 is optional, as there can be other blocks for providing services including implementing disclosed methods of and connecting to the cloud storage sites 1, 2 and 3 as well. For example, rest services block 120 can be replaced by another cloud-based data aggregation or collector service.

Rest services block 120 includes a computing system 124 including a processor 124a that has accessible firmware 121a in storage 121, or digital logic 126, shown in the rest services block 120 which implements disclosed methods. The processor 124a can comprise a digital signal processor (DSP), a microcontroller, an application specific integrated circuit (ASIC), a general processor, or any other combination of one or more integrated processing devices.

The computing system 124 can implement firmware 121a is for creating the PB using at least one OPC UA standard functionality and storing the PB in an OPC UA address space comprising a plurality of participant nodes that include IIoT edge-nodes including at least one edge gateway node (See field gateway 230 in FIG. 2 described below). The participant nodes 1, 2, 3, 4, 5 and 6 that are each configured in the IPF 105 to be communicably coupled to at least one cloud-based data storage medium 1, 2 and 3 that during IPF operation the plurality of participant nodes access data from, and the PB utilizes the nodes as blockchain participant nodes including at least two nodes shown as participants nodes 2, 3, 4 and 5 maintaining a public ledger 115 that functions as a transaction/blockchain manager including an updatable hash. The storage mediums, cloud 1, 2 and 3, have their own blockchain to have the data integrity using a truth-based model.

As known in the art, algorithms such as disclosed blockchain consensus for securing stored distributed IIoT device data algorithms may be implemented by hardware or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern as hardware including digital logic. Regarding software-based algorithm implementations, algorithm code stored in the associated memory can be implemented by the processor. Only one of the software and hardware including digital logic is needed for implementing blockchain consensus for securing stored distributed device data algorithms.

After a new block is created and the hash has been updated provided the new block is validated by at least a majority of the block voters, the new block will be propagated the PB participant nodes which are acting as a ledger. After the propagating, the regulator, leader or observer utilizes a time bound majority voting consensus to determine whether the PB participant nodes come to a consensus on a current storage state in the data storage medium, and the new block is added to the public ledger only when the PB participant nodes come to the consensus.

The disclosed PB thus functions as a data integrity service for IIoT data at rest and features:

1. The PB participant nodes can be any edge-node including edge gateway nodes. The Blockchain ecosystem is configured so that the edge-nodes can nominate other edge-nodes based on their capability to participate in voting.
2. The PB uses a timebound majority voting consensus algorithm which is the basis on which the PB participant nodes come to an agreement on the cloud storage or distributed storage state which it is using.
3. The PB ecosystem has a role-based participation, where a participant receives a selected single role selected from a blockmaker (defined below), BlockVoter (defined below), observer or BlockValidator, (defined below), and an optional RootHashCalculator (defined below).

In a disclosed PB ecosystem, there is included:

At least one blockmaker. Edge-nodes are responsible for making blocks are registered with a smartvoting contract. Whenever there is a data transaction sent to the cloud or a distributed edge storage device, there is a block generated by the blockmaker with the hash of the current state of the cloud or distributed edge storage device.

BlockVoter (or BlockValidator). Edge-Nodes which are provisioned with a voter/validator role, will validate a new block generated by blockmaker. Once the new generated block has been validated by majority of block voters/validators, this new block is added to the distributed ledger (see public ledger 115 in FIG. 1). The PB infrastructure can be set to a threshold of votes from the block voters for the PB consensus to agree on a consensus.

BlockObserver. An edge-node which can simply receive and validate the blocks.

RootHashCalculator. When data is stored in storage devices which cannot support services that is required to create a block, a roothashcalculator acts as a mediator which can perform the calculation of a hash in the storage devices.

The hash is updated in the public ledger 115 once a new block is validated by at least a majority meaning >50%, (e.g., at least 80%) of the assigned PB block voters which function as block validators. The validated new block is propagated to all PB participant nodes by the regulator, leader or observer which enables utilizing a time bound majority voting consensus to determine whether the PB participant nodes come to a consensus on a current storage state in the data storage medium. The new block is added to the public ledger only when the PB participant nodes come to a consensus on a current cloud or distributed storage state in the data storage medium, and can implement anomaly detection if no consensus is found.

The frequency of the voting generally occurs after generation of new block which is to be added to the PB. As described above, a disclosed PB can be built on an existing OPC UA industrial communication protocol. Each OPC UA application in the PB network will participate in PB creation with distinguished role and responsibility. When a node is added to a private IPF (distributed network case) or an externally connected IPF (such as Internet connected to cloud services) its role will be assigned based on the endpoint URL exposed by the OPC UA application. Periodically the roles will generally be switched to make sure that no participant nodes in the network are acting maliciously except the block maker and voter until the creation of a PB is completed. This change in the role will be handled with the help of the leader or regulator. As described above, the leader will be elected periodically from all the nodes in the private or externally connected IPF.

Each edge-node where the data will be pushed can be pushed to the cloud, or a flash drive or secure digital (SD) card in a distributed network which may be called a Data Lake. Each data lake will have its own Blockchain. Each data lake has its own Blockchain because if one keeps a single Blockchain irrespective of number of data lakes/storage medium the Blockchain length will grow in huge number will be difficult to manage over the time. The hash in the PB public ledger will be updated and the update will be propagated to all the PB participant nodes thereby enabling a consensus to be maintained. The PB participant nodes include one or many aggregator gateway nodes or any IIoT Edge-node, and the PB participants have a public key and private key, where the public key is shared with all the PB participants.

Each of the transactions (e.g., block aggregator, such as rest service 120, to the cloud) can be signed by a private key of the PB participant. All PB Participants are assumed to have a zone file (see zone file 107 in FIG. 1) which can be similar how a Domain Name Server (DNS) uses a zone file, where herein the zone file is used for mapping for device data producer to the unique blob Uniform Resource Identifier (URI) which uniquely identifies a blob, which tells which storage blob the aggregator needs to send the data blocks to. Here all the transactions, i.e. any IIoT data transferred between the aggregator gateway node (see field gateway 230 in FIG. 2 described below) and cloud storage provider, have their hashes recorded in the publicly shared ledger (see public ledger 115 in FIG. 1) once the new block is validated by at least a majority of said block voters.

At any time, the PB participant nodes (i.e., the edge-nodes) can call the address of the "voting smart contracts" which is present in the public ledger 115 for verifying the integrity of the IIoT data stored in their respective edge/cloud storage blobs. For any update to the storage blobs, the hash in the public ledger 115 will be updated in the public ledger once the new block is validated by at least a majority of the block voters, and the update (new block) will be propagated by the regulator, leader or observer to all the PB participants' nodes enabling them to come to a consensus on a current storage state in the data storage medium. The new block is added to the public ledger only when the PB participant nodes come to a time bound majority voting consensus.

Figure 2:
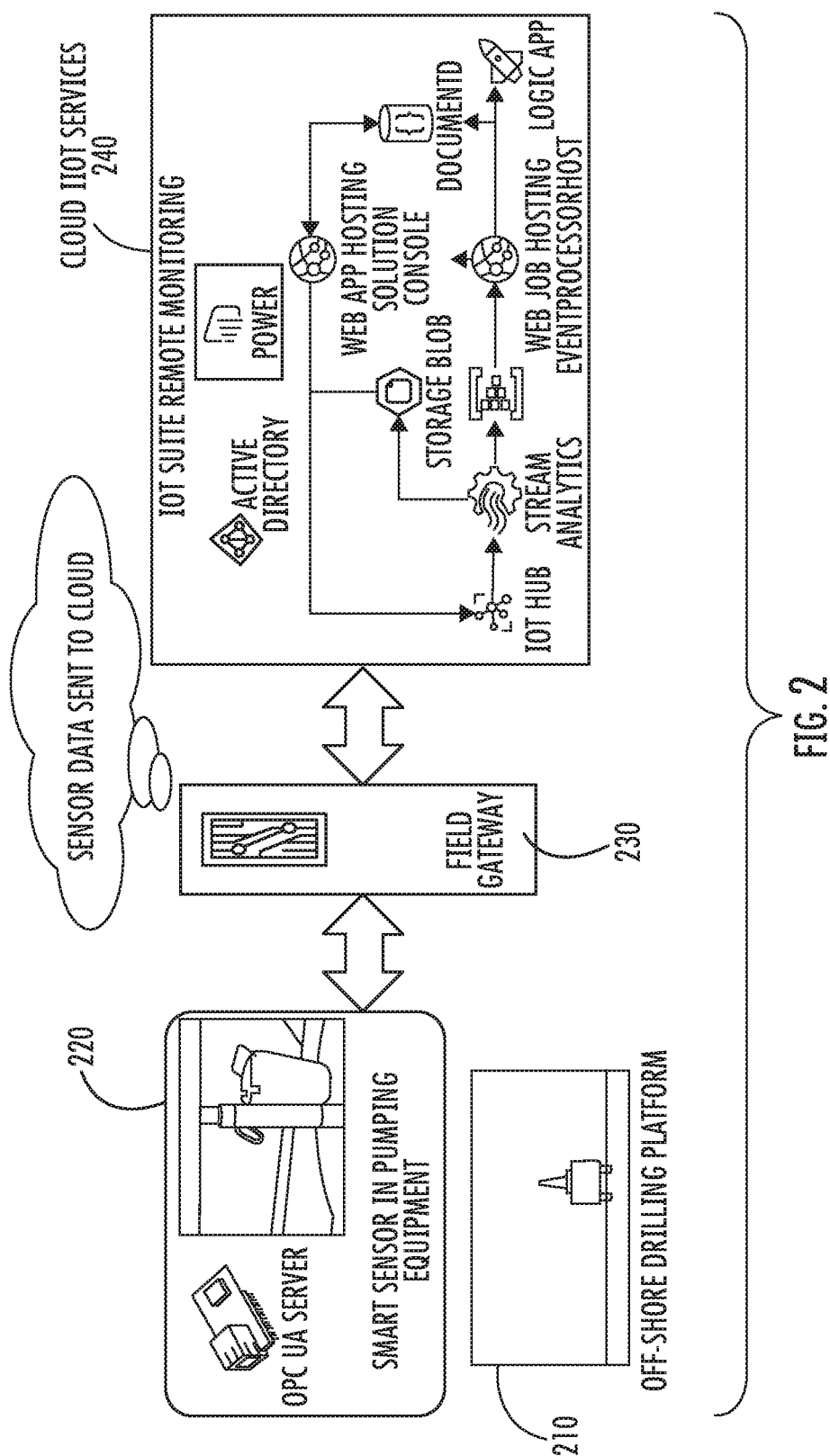
FIG. 2 shows an example IIOT edge cloud connected IPF use case that can benefit from implementing disclosed blockchain consensus for securing stored distributed IIoT device data at rest.

FIG. 2 shows an example IIOT edge cloud-connected IPF use case that can benefit from implementing disclosed PB consensus for securing stored distributed IIoT device data stored in the cloud. FIG. 2 shows an example off-shore drilling platform 210 which has a connected smart sensor 220 associated with pumping equipment which is transmitting shop floor data through a field gateway 230 to IIoT cloud services 240 for further data processing (and data storage). The PB participants are the smart sensor 220 in the edge environment, the IIoT field gateway node 230, and an IIoT cloud services 240. The PB workflow described herein will be followed by these PB participants 210, 220, 230 for securing the IIoT data at rest. Once the smart sensor 220 wants to transmit IIoT data to cloud, a PB Blockmaker (not shown in FIG. 2) will create a block, which will be validated by the PB participant nodes and added to PB provided it passes a disclosed consensus algorithm.

Figure 3:
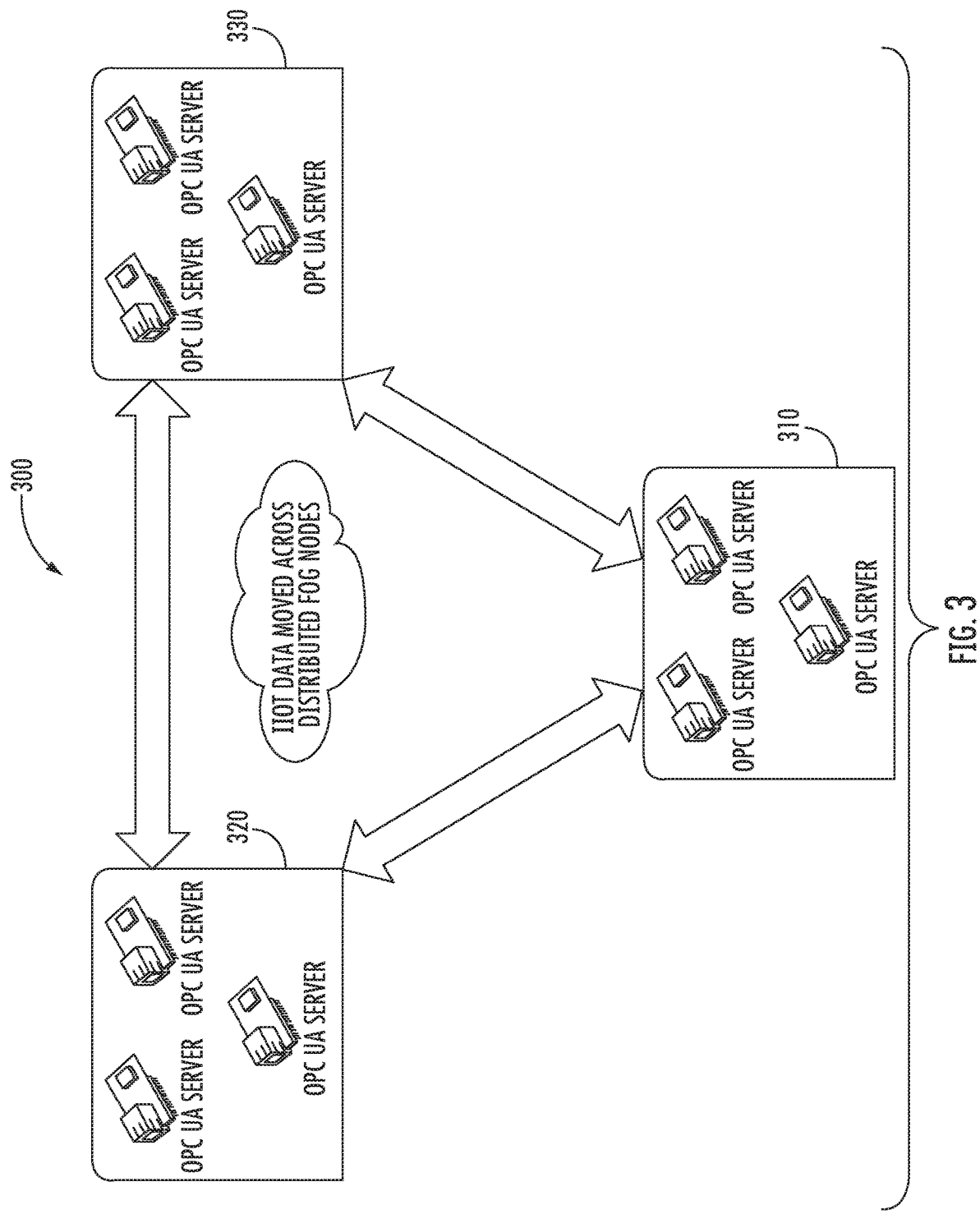
FIG. 3 shows an example distributed edge connected network use having a PB deployed in a geographically distributed edge environment that can benefit from implementing a disclosed blockchain consensus for securing stored distributed IIoT device data at rest.

FIG. 3 shows an example distributed edge connected industrial network 300 that although not being cloud connected, can benefit from implementing a disclosed PB consensus for securing stored distributed IIoT device data at rest. The PB for the system in FIG. 3 is deployed is a geographically distributed edge environment comprising a fog or edge network. There is a basic architectural difference between fog and edge networks. Fog computing pushes intelligence down to the local area network level of network architecture, processing data in a fog node or an IoT gateway (this is supposed to be the non-cloud case). Edge computing pushes the intelligence, processing power and communication capabilities of an edge gateway or appliance directly into devices like programmable automation controllers (PACs).

Industrial network 300 includes smart sensor nodes 310, 320 and 330 each including a plurality of OPC UA servers that are coupled to receive IIoT process data from their respective processing equipment in an IPF. The smart sensor nodes 310, 320 and 330 are each shown including an Edge storage site shown as Edge 1, Edge 2 and Edge 3, respectively, that store IIoT data associated with operation of the industrial network 300. The PB in FIG. 3 thus involves set of smart sensor nodes 310, 320, 330 which are deployed in a geographically distributed fog nodes (such as located in different countries) which are generating data that is being distributed across the different fog environments. The PB workflow described herein will be followed by these participant edge-nodes for securing the edge data at rest.

Figure 4A:
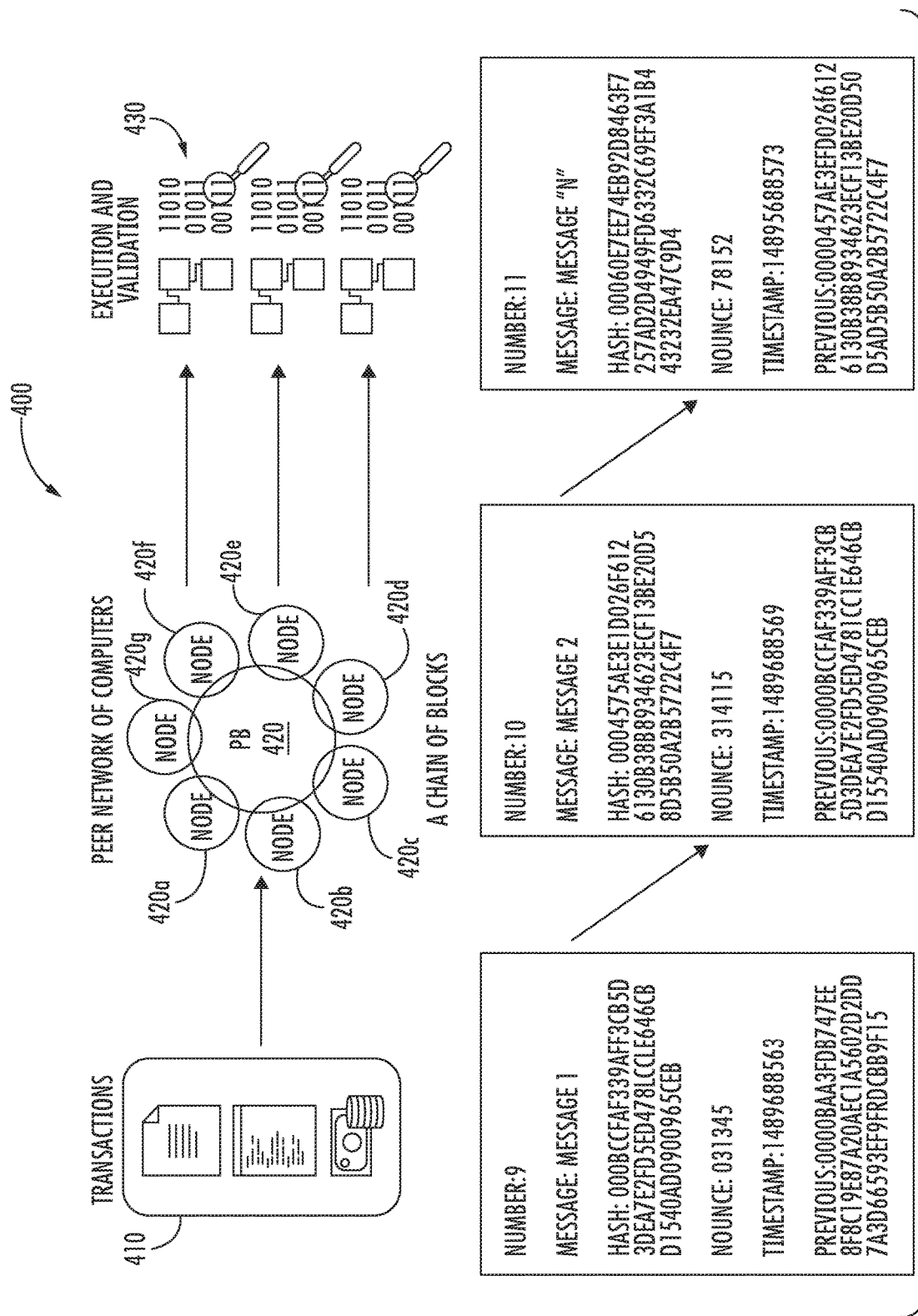
FIG. 4A shows the workings of an example PB which describes a high level representation of a PB, which involves a peer of distributed Blockchain participants nodes and transactions that are part of PB ecosystem. Each block has unique attributes including blocknumber, actual message, hash reference, nonce, and a timestamp.

FIG. 4A shows workings for of an example PB ecosystem 400 which describes a high level representation of a PB, including a peer network of computers 420 comprising distributed blockchain participants edge-nodes 420a, 420b, 420c, 420d, 420e, 420f and 420g, and transactions 410 that are part of the PB ecosystem, along with a depiction of the execution and validation 430 result. Each block generated is shown to have unique attributes including a blocknumber, actual message, hash reference, nounce, timestamp and a previous message.

FIG. 4B shows an example genesis block 'n' 460. For any OPC UA blockchain ecosystem, the genesis block is the root node of the PB which is initialized by a PB regulator with custom information such as shown as a namespaceindex for the blockchain, device ID, participant details, sampling/publishing interval time, and timestamp details.

Figure 5A:
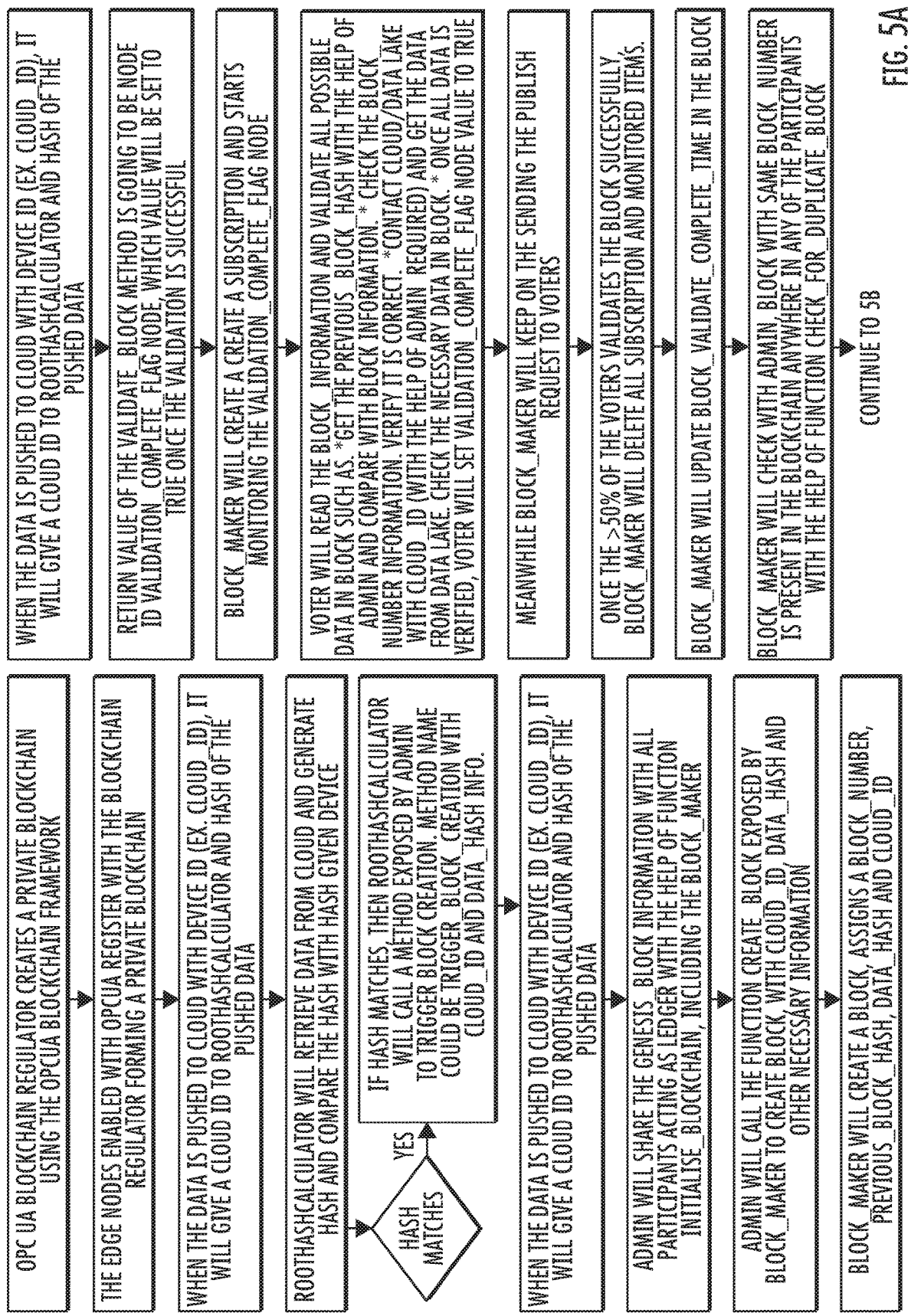
Figure 5C:
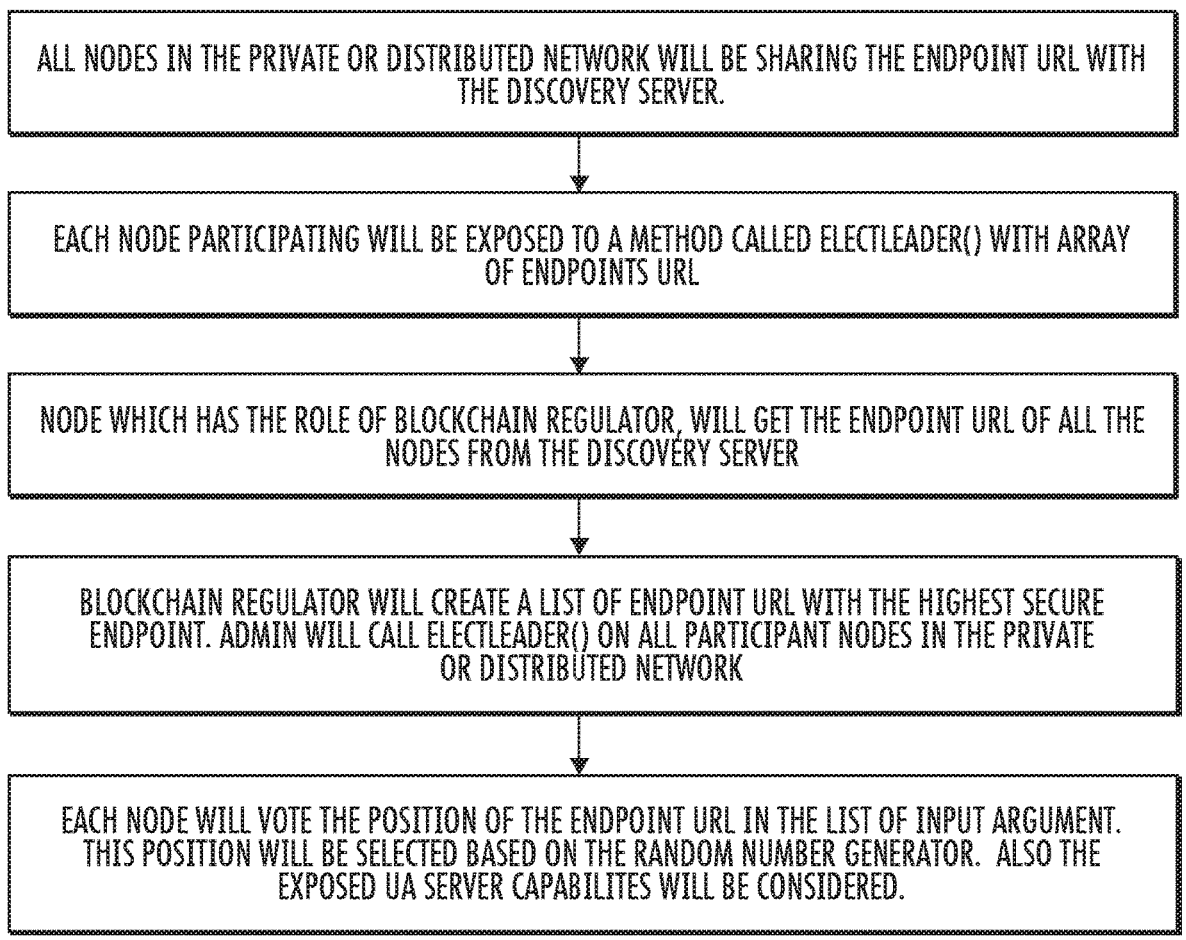
FIG. 5C shows an example leader election workflow. Sub/Mon is a known mechanism used in OPC and OPC UA to subscribe for any data change by monitoring a node in the OPC address space.

FIGS. 5A-B show a disclosed PB realization with OPC-UA sub/mon or OPC-UA pub/sub for implementing a disclosed blockchain consensus for securing stored distributed device data at rest, while FIG. 5C shows an example leader election workflow. Sub/Mon is known to be a mechanism used in OPC and OPC UA to subscribe for any data change by monitoring a node in the address space. Regarding the sub/mon approach, the ledger node can act as OPC UA Client and/or server at the same time. The blockmaker will be acting as an OPC UA Server.

Once the regulator/leader assigns a role as blockmaker, the blockmaker will create a node where newly created and validated block will be updated. The node ID will be communicated from regulator or leader while assigning the role in the genesis block. The regulator or leader will inform the ledger(s) of that private network about the new blockmaker and node ID of newly created and validated block. In this case, once the blockmaker creates a block, and the block value can be updated in the OPC UA Node. This block will be propagated to the block validator's using OPC UA Standard sub/mon mechanism whereby the validator's would receive the new Block update for Validation. After validation, the blockmaker updates the validated block information to a node which is monitored by ledger(s). In case of OPC UA the pub or sub approach blockmakers are publishers, and the validators and ledgers are subscribers.

At any point, if an 'attacker' being any external or internal threat vector which could tamper the data store in data storage used by the PB wants to compromise the infrastructure and manipulate the data stored, there should be at least >50% of the PB nodes should be compromised which can be difficult compared to a centralized system. Also, as described above, also disclosed is an intelligent data anomaly detection mechanism for the blockchain ecosystem for fraudulent activity detection (anomaly detecting) using machine learning. Machine learning is the application of artificial intelligence to provide the PB the ability to learn and improve from their own experiences without being explicitly programmed for each and every condition.

Anomaly detection is an in-depth security mechanism for a disclosed PB, whereby the observer or a regulator will have an in-built auditing mechanism which records the historical activities of the PB participant nodes in a repository. In a periodic manner the PB regulator or administrator will perform a clustering activity using a machine learning technique which will output anomaly patterns in feed data if a particular timestamped recorded pattern belongs to an anomaly or a fraudulent activity in a PB network. For example, the machine learning can be based on K-Means or other data clustering algorithm.

Example features or parameters that can be used in the clustering machine learning process are described below:
1. Number of times the block created by a particular blockmaker has been rejected.
2. Number of failed voting done by a particular blockchain voter in that PB network.
3. Average-time interval between Block generations by a particular PB participant.
4. Frequency of participation in leader election by the same Blockchain node.
5. Average validation time of a block by a PB voter node.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, the M2M data communication protocol can be other than OPC UA. In addition, while a particular feature may have been disclosed with respect to only one of several implementations, such feature may be combined with one or more other features of the other implementations as may be desired and advantageous for any given or particular application.

The invention claimed is:

1. A method of securing stored industrial data associated with operation of an industrial processing facility (IPF), comprising:
creating a private blockchain (PB) using at least one OPC Unified Architecture (OPC UA) standard functionality and storing said PB in an OPC UA address space to add said PB to an OPC UA communication protocol framework comprising a plurality of nodes in a network comprising IIoT edge-nodes communicably coupled to at least one data storage medium where during said IPF operation said plurality of nodes access Industrial Internet of Things (IIoT) data comprising sensor data including process data from field devices in said IPF from, said PB utilizing said plurality of said IIoT edge-nodes as PB participant nodes including at least two of said nodes maintaining a public ledger including an updatable hash, wherein said data storage medium has its own blockchain;
generating new blocks, a block voter, and an observer from a blockmaker based on selecting a single role where said PB having a role-based participation including a regulator or leader assigning said PB participant nodes;
validating said new block by at least a majority of said block voters and updating said hash in said public ledger;
propagating said new block to all said PB participants nodes;
after said propagating, said regulator, said leader or said observer utilizing a time bound majority voting consensus to determine whether said PB participant nodes come to a consensus on a current storage state in said data storage medium, and
adding said new block to said public ledger only when said PB participant nodes come to said consensus.

2. The method of claim 1, wherein said data storage medium is cloud located and Internet connected.

3. The method of claim 1, wherein said data storage medium is within a distributed network within a private IPF that is not Internet connected.

4. The method of claim 1, wherein said OPC UA standard functionality comprises a publishing subscription mechanism or a monitoring mechanism.

5. The method of claim 1, further comprising after said consensus is found for said current storage state, said PB participant nodes initiating transactions involving said process data.

6. The method of claim 1, wherein said plurality of nodes utilize data stored in said data storage medium for running an industrial process in said IPF.

7. The method of claim 1, further comprising if no said consensus is found, implementing anomaly detection in said PB comprising machine learning.

8. The method of claim 1, wherein said PB is a distributed network and does not include any central authority for said creating or for utilizing said time bound majority voting consensus, and wherein any one or more of said edge-nodes comprises said blockmaker.

9. The method of claim 1, wherein all said PB participant nodes include a public private key pair for securing transactions between said PB participant nodes.

10. An industrial processing facility (IPF) having a plurality of nodes in a network all coupled to at least one storage medium, said network having at least one of a processor and digital logic configured for implementing a method of securing stored data associated with operation of said IPF, said IPF comprising:
the at least one of a processor is further configured to:
create a private blockchain (PB) using at least one OPC Unified Architecture (OPC UA) standard functionality and store said PB in an OPC UA address space to add said PB to an OPC UA communication protocol framework comprising said plurality of nodes in a network comprising IIoT edge-nodes communicably coupled to at least one data storage medium where during said IPF operation said plurality of nodes access Industrial Internet of Things (IIoT) data comprises sensor data including process data from field devices in said IPF from, said PB that utilizes said plurality of said IIoT edge-nodes as PB participant nodes including at least two of said nodes maintains a public ledger including an updatable hash, wherein said data storage medium has its own blockchain;
generate new blocks, a block voter, and an observer from a blockmaker based on selecting a single role where said PB having a role-based participation including a regulator or leader assigning-said PB participant nodes;
validate said new block by at least a majority of said block voters and update said hash in said public ledger;
propagate said new block to all said PB participants nodes, and
after said propagating, said regulators, said leader or said observer utilizing a time bound majority voting consensus to determine whether said PB participant nodes come to a consensus on a current storage state in said data storage medium, and add said new block to said public ledger only when said PB participant nodes come to said consensus.

11. The IPF of claim 10, wherein said data storage medium is cloud located and Internet connected.

12. The IPF of claim 10, wherein said data storage medium is within a distributed network within a private IPF that is not Internet connected.

13. The IPF of claim 10, wherein said OPC UA standard functionality comprises a subscription monitoring mechanism or a monitoring mechanism.

14. The IPF of claim 10, wherein said method further comprises after said consensus is found for said current storage state, said PB participant nodes initiating transactions involving said IIoT data.

15. The IPF of claim 10, wherein said method further comprises if no said consensus is found, implementing anomaly detection in said PB comprising machine learning.

16. The IPF of claim 10, wherein said PB is a distributed network and does not include any central authority for said creating or for utilizing said time bound majority voting consensus, and wherein any one or more of said edge-nodes can comprise said blockmaker.

17. The IPF of claim 10, wherein all said PB participant nodes include a public private key pair for securing transactions between said edge-nodes.

* * * * *